May 4, 1954 H. C. CUSHING 2,677,382
PORTABLE LUBRICANT CONTAINER CLEANER
Filed June 1, 1950
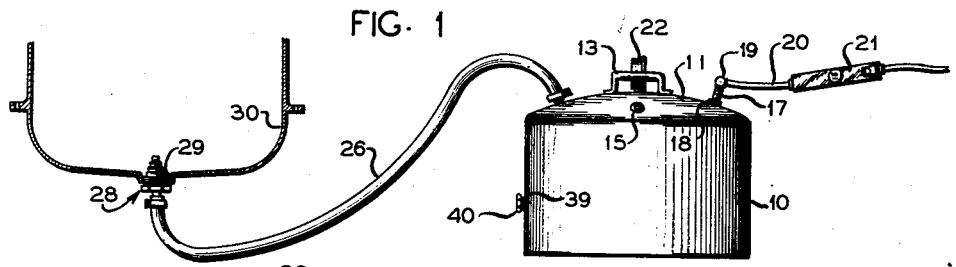
FIG. 1
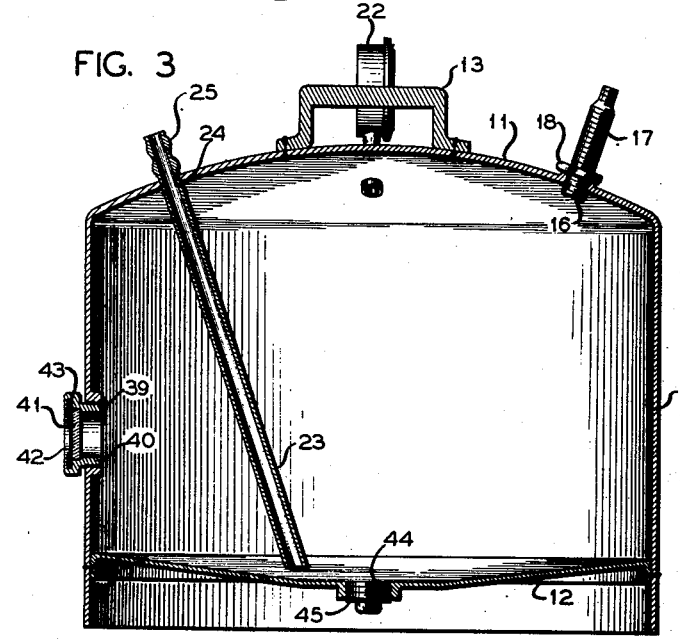
FIG. 3
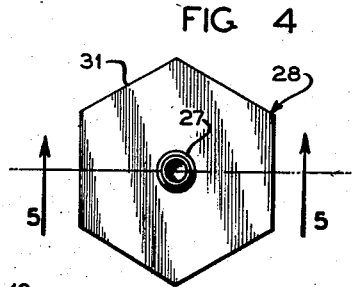
FIG. 4
FIG. 5
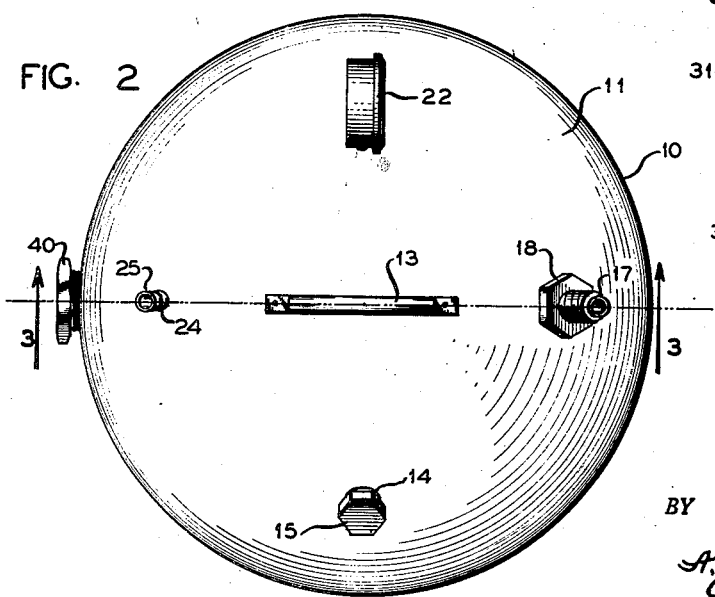
FIG. 2
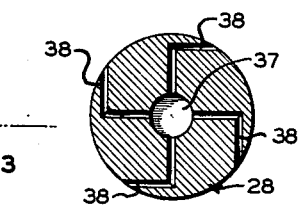
FIG. 6
*INVENTOR.*
H. C. CUSHING
BY
A. Yates Dowell
ATTORNEY Patented May 4, 1954

2,677,382

UNITED STATES PATENT OFFICE 2,677,382

PORTABLE LUBRICANT CONTAINER CLEANER

Huston C. Cushing, Huntsville, Ala.

Application June 1, 1950, Serial No. 165,540

1 Claim. (Cl. 134—167)

This relates to the rendition of service particularly in a business in which the performance of service constitutes an important part of the same and the reaction thereto is responsible for the success of other places of the business including additional service and sales.

This invention relates to the servicing of mechanical devices in which friction is reduced by the use of lubricants of different degrees of consistency, between that of a thin liquid and that of a solid.

This invention particularly relates to the servicing of automobiles and other machinery of a movable or stationary character having moving parts contained in a housing in which lubricant is employed and which lubricant gradually becomes exhausted, dirty or otherwise unfit for use and in need of replacement.

Specifically, the present invention relates to the removal of lubricant which is no longer capable of performing its intended lubricating function in order that fresh or new lubricant added will not be diluted or contaminated with the residue of lubricant drained from the chamber in which the lubricant is used such as, for example, lubricant from the crank case, transmission, or differential of an automobile.

After lubricant has been used for a period of time it loses its lubricating properties and ordinarily is discarded by permitting its discharge through a drainage opening in the lowermost portion of the wall or housing in which the lubricant is contained. Efforts have been made to remove any lubricant left after the drainage operation by adding additional lubricant of very thin consistency or by means of low specific gravity or by using some solvent or other fluid such as kerosene or the like. However, this has not been thorough or reliable with consequent reduction in quality of and efficiency from the fresh or added lubricant.

It is an object of the invention to provide a relatively simple, inexpensive, portable device by the use of which a chamber in which lubricant has been contained can be cleaned with a minimum of time and effort.

Another object of the invention is to provide a device of the character described which itself can be easily cleaned, is fool-proof, and is composed of the fewest and simplest of parts and having means permitting visibility of its interior as well as for imparting cleaning fluid through a particular motion for the most efficient action.

Other objects and advantages of the invention will be apparent from the following description taken in conjunction with the accompanying drawings, wherein:

Fig. 1 is an elevation illustrating one application of the invention;

Fig. 2, top plan view;

Fig. 3, a section on the line 3—3, in Fig. 2;

Fig. 4, a bottom plan view of a multiple connector;

Fig. 5, a section on the line 5—5, of Fig. 4, and

Fig. 6, a section on the line 6—6, of Fig. 5.

Briefly stated, the invention comprises a portable receptacle for containing liquid to be used in the cleaning process, such receptacle having a handle by means of which it may be transported, a drainage plug in its bottom, a combination liquid level and vision permitting plug in its side wall, and a filling plug in its upper portion as well as an opening for the admission of air for driving the fluid from the receptacle, an outlet for fluid disposed beneath the normal liquid level adjacent the bottom of the receptacle, a flexible hose through which fluids may be conducted from said outlet, a multiple or universal connector on the end of said flexible hose adapted to be fastened in the drainage opening of the wall of the chamber in which lubricant has been contained, said connection being provided with an angular discharge passage for imparting rotary motion to the fluid in said chamber, the amount of air pressure being adapted to be controlled in a valve and with a pressure gauge on the top of the receptacle for observing the pressure therein and for utilizing pressure in proportion to the amount of fluid utilized.

With continued reference to the drawing there is shown a substantially cylindrical receptacle 10 which has a diameter greater than its width. The cylinder has a fornicate top 11, and a bottom 12, the latter being preferably disposed within the cylinder and spaced from the end of the same so that when the cylinder rests on its lower edge upon a surface, the bottom of the cylinder will be supported upon such surface.

The receptacle 10 is provided with a handle 13 centrally of its top for balance and transportation and with a filling opening 14, for the reception of a filling plug 15, and with an air inlet opening 16, for the reception of an air valve 17. The valve 17 is threaded into the opening 16 and is locked in position by a cork nut 18.

To the valve 17 is adapted to be applied the nozzle 19 of an air hose 20. Flow of air into the receptacle is controlled by a control valve 21.

The receptacle is provided in its side with a threaded opening wall 39 for the reception of a combination liquid level determining and vision permitting plug 40 having a transparent portion 41 held by a keeper ring 42 and sealed by a gasket 43. Through the transparent portion 41 the interior may be observed and by removal of the plug the height or the liquid may be controlled.

The receptacle is provided in its upper portion with pressure indicating means or a pressure gauge 22 by means of which the pressure of the air in the receptacle may be determined. By means of air admitted into the receptacle through the valve 17 a cleaning agent such as oil of low specific gravity, kerosene or other substance may be driven from the receptacle into the area to be cleaned.

In order to allow the fluid to be discharged from the receptacle into a chamber in which lubricant has been contained a discharge tube 23 is mounted preferably at an angle within the receptacle. The lower end of the tube 23 is disposed near the bottom of the receptacle adjacent the center of the same and extending at an angle through an opening 24 in which it is secured as by welding or other means, in the top of the receptacle and terminating in a nipple or fitting 25 for the reception of a flexible hose 26 for conducting the liquid to the container to be cleaned.

The outer end of the flexible hose 26 is attached to a nipple or fitting 27 of a multiple or universal connector 28 for attachment in the drainage opening 29 of the wall 30 of a container to be cleaned. The connector 28 has a wrench engaging polygonal portion 31 and stepped threaded diameters 32, 33, 34, 35 and 36 to make the device substantially universal. The connector 28 has a discharge passage 37 terminating in tangential or angularly disposed nozzle orifices 38 for imparting turbulence or rotary motion to the cleaning fluid or solvent within the structure to be cleaned for effecting a more thorough contact of the cleaning fluid with the walls and other parts to be cleaned within the contained so that they can be completely cleaned, such connection being adapted to be removed to facilitate free drainage from the container.

The central portion of the bottom 12 of the receptacle 10 is slightly lower than the surrounding portion of the same to form a sump from which drainage may be had through a threaded opening 44 closed by a plug 45.

It will be obvious to those skilled in the art that various changes may be made in the invention without departing from the spirit and scope thereof and therefore this invention is not limited by that which is shown in the drawing or described in the specification but only as indicated in the appended claim.

What is claimed is:

A portable device for cleaning a chamber in which lubricant has been contained comprising a substantially cylindrical receptacle adapted to contain a liquid to be used in the cleaning process, said receptacle being of a diameter greater than its height and having supporting structure for spacing the bottom of the same above a surface upon which the device is located, said receptacle having a handle by means of which it may be transported, a filling plug in its upper portion, said receptacle having a downwardly dished bottom, a drainage plug in the lowest point of the bottom of said receptacle, said receptacle having an opening for the admission of air at a predetermined pressure through its upper portion, means to connect a source of air under pressure with said receptacle through said opening, a tube extending from the interior of the receptacle adjacent the lowest point of the dished bottom of the same through the upper portion of the receptacle at a location spaced from the said opening for the attachment of a flexible hose, a flexible hose connected to said tube, a connector on said hose for attachment to the drainage opening of the chamber in which lubricant has been contained and with a passageway from said flexible hose through said connector, said passageway terminating in angularly disposed discharge orifice means arranged tangentially to the inner portion of said connector for imparting rotary motion to liquid in said chamber.

References Cited in the file of this patent

UNITED STATES PATENTS

| Number | Name | Date |
|---|---|---|
| 1,142,083 | Dodge | June 8, 1915 |
| 1,701,864 | Reinhardt | Feb. 12, 1929 |
| 1,886,738 | Redfield | Nov. 8, 1932 |
| 2,076,262 | Black | Apr. 6, 1937 |
| 2,173,554 | Hill | Sept. 19, 1939 |
| 2,175,951 | Bulleri | Oct. 10, 1939 |
| 2,240,227 | Saussure | Apr. 29, 1941 |
| 2,266,288 | Thompson | Dec. 16, 1941 |
| 2,552,749 | Tabet | May 15, 1951 |